May 28, 1935. E. M. PFAUSER 2,003,155
REVERSIBLE FRICTION CLUTCH
Filed July 1, 1932 2 Sheets-Sheet 1

Inventor
Edward M. Pfauser
By Young Young
Attorneys

May 28, 1935.　　　　E. M. PFAUSER　　　　2,003,155
REVERSIBLE FRICTION CLUTCH
Filed July 1, 1932　　　2 Sheets-Sheet 2
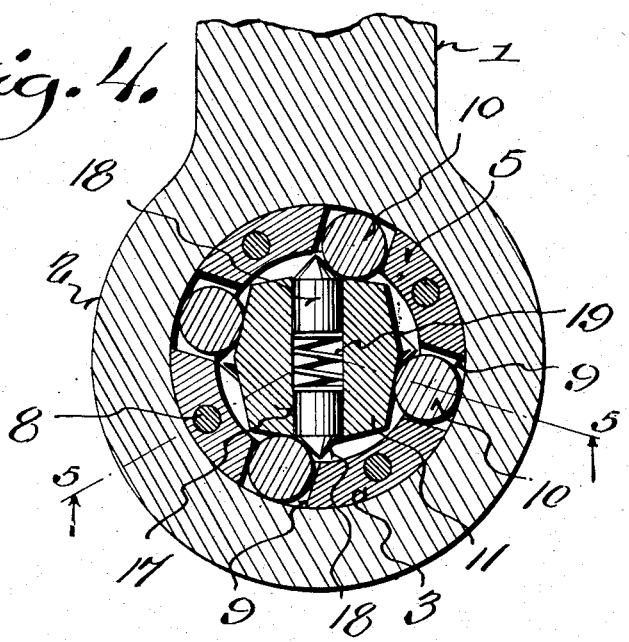
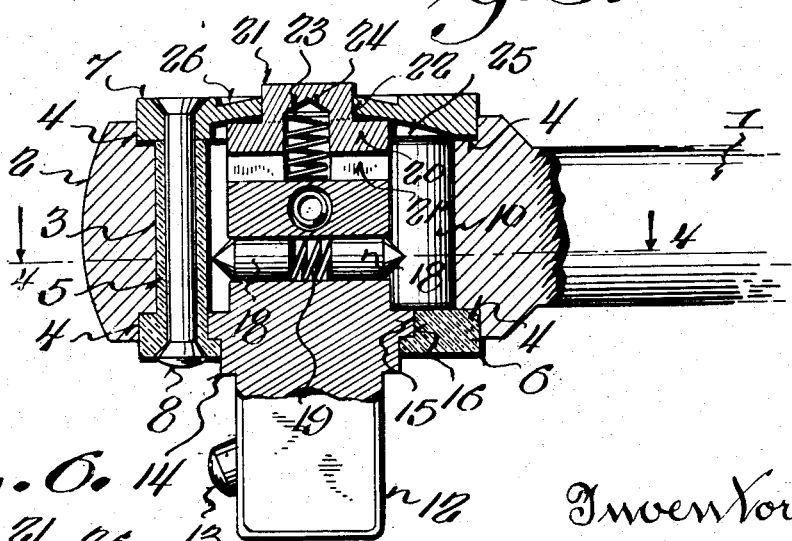
Inventor
Edward M. Pfauser
By
Attorneys Patented May 28, 1935

2,003,155

UNITED STATES PATENT OFFICE 2,003,155

REVERSIBLE FRICTION CLUTCH

Edward M. Pfauser, Wauwatosa, Wis., assignor to Blackhawk Mfg. Co., Milwaukee, Wis., a corporation of Wisconsin Application July 1, 1932, Serial No. 620,401

8 Claims. (Cl. 192—44)

This invention pertains to tools, and more particularly to a reversible friction clutch, such as disclosed in my copending Patent No. 1,936,640.

In the structure disclosed in the aforesaid patent, the clutch control mechanism is releasably held in adjusted position largely by the action of the spring plungers, which selectively engage the frictional rollers upon opposite sides of their longitudinal axis. Also, it was endeavored to create a frictional bind between the clutch control sleeve and the head of the wrench. However, in practice it was found that this was not sufficient to hold the clutch sleeve in adjusted position, and in use the same had a tendency to rotate, resulting in undesired reversal of the action of the clutch.

Therefore, the present invention has primarily for its object to improve clutches of the foregoing character by the provision of means for positively locking the clutch control mechanism in selective adjusted position.

A still further object resides in the diagonal arrangement of the locking key with respect to the tool-receiving member, thus providing maximum length and engagement of the key.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:—

Figure 4 is a longitudinal section taken on the line 4—4 of Figure 5.

Figure 5 is a vertical section taken on the line 5—5 of Figure 4, and

Figure 6 is a fragmentary detail section of the locking mechanism.

Referring now more particularly to the accompanying drawings, the numeral 1 designates a conventional wrench handle provided with an annular head 2, having a transverse annular bore 3 terminating in enlarged shouldered recesses 4, formed in the opposite faces of the head. The annular portion of the head 2 constitutes a band.

Figure 2:
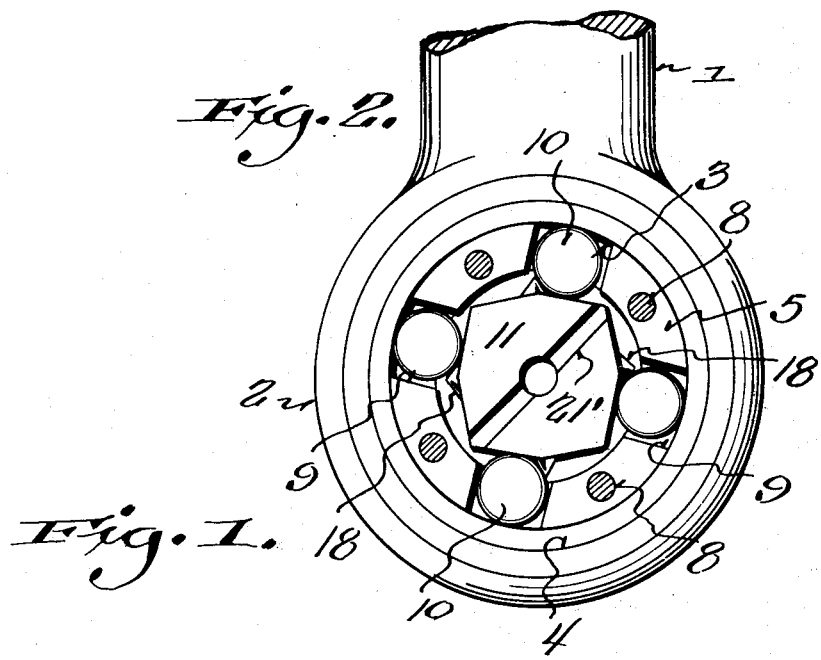
Figure 2 is an enlarged detail view of the wrench head with the retaining plate removed.
Figure 1:
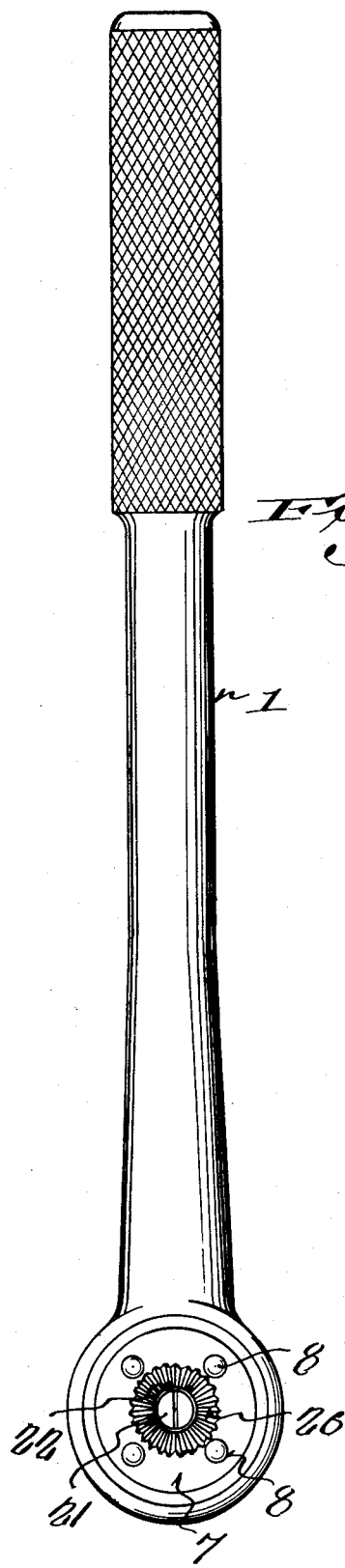
Figure 1 is an elevation of a wrench constructed in accordance with the present invention.
Figure 3:
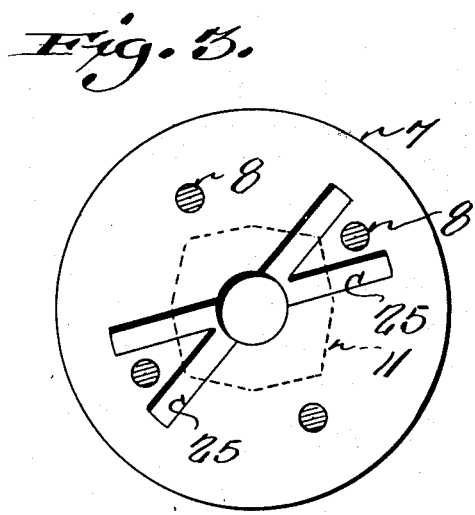
Figure 3 is a bottom plan view of the retaining plate.

As best shown in Figures 2 and 5, a sleeve 5 is rotatably positioned within the bore 3 and provided with an annular flanged lower end 6 positioned within the lower shouldered recess 4. An annular retaining plate 7 engaged in the upper recess 4, and secured to the sleeve 5 by rivets 8, or other suitable means, serves to retain the sleeve within the head 2, and also house the remaining mechanism to prevent the accumulation of dirt and grease therein.

As best shown in Figures 2 and 4, the sleeve 5 is provided with diametrically disposed slots 9 for reception of the frictional rollers 10. Rotatably mounted within the bore 3 is a stud, in this case consisting of the square end 11 of a wrench socket receiving shank 12, the lower end of which is provided with a conventional spring-urged plunger 13 for releasably retaining the socket thereon. Intermediate its ends the shank 12 is provided with an annular bearing surface 14, rotatably journalled within the lower end of the sleeve 5, while the flange 15, engaged in the shouldered recess 16, serves to hold the shank in assembled position within the sleeve.

The stud or square end 11 of the shank 12 is provided with a pair of spaced, transverse bores 17 extending at right angles to each other and parallel to the faces of the shank. Positioned within the bores are plungers 18 provided with conical heads, and having disposed therebetween expansible springs 19, urging each pair of plungers toward projected position. As best shown in Figures 2 and 4, each plunger engages one of the frictional rollers 10 to retain the same in engagement with one side of the adjacent face of the square end 11 of the shank, and the inner bore 3 of the band or head 2. While the stud or end 11, positioned within the sleeve 5, has been described as square, it is to be understood that the same may be variously formed, it being merely essential that it be provided with flattened faces adapted to cooperate with the frictional rollers 10, as hereinafter described.

Considering the operation of the wrench, with particular reference to Figure 2, it will be quite apparent that as the band or head 2 is rotated in a clockwise direction, the frictional rollers 10 will provide wedging frictional engagement between the inner bore 3 of the band or head 2, and the adjacent face of the stud or square end 11 of the shank, whereas, when rotated in anti-clockwise direction, the band or head 2 will slip past the frictional rollers 10, thus providing intermittent ratchet actuation of the shank 12. When it is desired to reverse the direction of frictional engagement of the rollers 10, it is merely necessary to rotate the sleeve 5 with relation to the stud or square shank 11, thus causing the frictional rolls to pass by the plungers 18 and engage the opposite side of the faces of the stud or square head, in which position of the rollers 10, operable clutching engagement between the band or head 2 and the shank 12 occurs upon rotation of the head 2 in an anti-clockwise direction.

The foregoing operation is identical with that described in the aforesaid patent, and therefore forms no part of the present invention, other than in the combination hereinafter claimed. Likewise, the structural features thus far described differ from those disclosed in said application, only insofar as the method employed for retaining the tool-receiving shank and the sleeve 5 in assembled relation with the head 2.

As set forth in the preceding objects, the present invention consists essentially in the provision of means for locking the sleeve 5 in adjusted position relative to the stud or square shank 11. This is accomplished by the provision of a key 20 engaged within the diagonal groove 21' formed in the top of the square end 12, and provided with an annular button 21 projecting through the central opening 22, formed in the retaining plate 7. Thus, when the key 20 is projected, as disclosed in Figures 5 and 6, the same serves to positively lock the retaining plate, and consequently the sleeve 5, with relation to the square end 12.

When it is desired to rotate, or shift, the sleeve 5, with relation to the square shank 12, it is merely necessary to depress the key 20 by exerting a thumb pressure upon the button 21, which releases the key from the slot 25, in which it is engaged, and permits the sleeve to be rotated, after which the key is released to engage the adjacent slot 25 to again lock the sleeve with relation to the shank. The slots 25 are so formed as to lock the sleeve and shank in both relative operable positions, and inasmuch as the key-receiving groove 21' is formed diagonally of the stud or square shank 11, it will be readily appreciated that the maximum length of key, and engagement with both the shank and the retaining head or plate, are obtained, thus providing a rigid positive lock, and reducing the possibility of mutilating the grooves, particularly those formed in the bottom face of the retaining plate to a minimum.

From the foregoing explanation, taken in connection with the accompanying drawings, it will be quite apparent that an exceedingly simple, positive and efficient lock has been provided, which prevents shifting of the clutch sleeve, with resultant undesired reversal of the action of the clutch. To facilitate shifting of the clutch sleeve in operation, the top face of the retaining plate, surrounding the key extension 21, is serrated or roughened at 26, thus enabling the thumb to frictionally grip the retaining plate upon depression of the key 20, and hold the sleeve during shifting of the shank 12 relative thereto.

It is to be further understood that while the invention has been illustrated in connection with hand wrenches, the same is equally applicable to various machine or power operated tools, and that the structure illustrated and described may be reversed without departing from the invention. In other words, the outer head may be the tool-receiving member, or actuated member, and the inner shank the operating member.

I claim:—

1. A tool of the class described comprising, an oscillating member, a rotatable member carried by said oscillating member and provided with a flattened face, frictional means disposed between said rotatable and oscillatory members for effecting operable frictional engagement therebetween, means for reversing the direction of said operable frictional engagement, said rotatable member being provided with a groove in its upper end, and said reversing means being provided with a pair of grooves adapted to be selectively alined with the groove in said rotatable member, and a releasable key engaged in the groove in said rotatable member and adapted to selectively engage one of the grooves in said reversing means.

2. A tool of the class described comprising, an oscillatory member, a shiftable sleeve mounted within said oscillatory member and provided with spaced slots, frictional elements disposed in said slots, a rotatable member having flattened faces positioned in said sleeve for engagement with said frictional elements, means for shifting said frictional elements with relation to said rotatable member to reverse the direction of operable engagement of said frictional members, said rotatable member being provided with a transverse groove in its upper end extending across its greatest width, said shifting means being provided with a pair of grooves adapted to be selectively alined with the groove in said rotatable member, and a releasable key engaged in the groove in said rotatable member for selective engagement with one of the grooves in said shiftable member.

3. In a clutch mechanism, an operating member, a driven member rotatably mounted in said operating member, clutch rollers effecting operable frictional engagement between the operating member and driven member, means reversing the direction of said operable frictional engagement, and releasable means for locking the driven member and said reversing means in relative adjusted positions against rotary motion including a locking key carried directly by the driven member for selective engagement with the reversing means, said locking key having means for imparting an axial unlocking motion thereto.

4. In a clutch mechanism, an operating member, a driven member rotatably mounted in said operating member, means effecting operable frictional engagement between the operating member and driven member, means reversing the direction of said operable frictional engagement including a shiftable sleeve provided with a closure plate at one end for the operating member, and releasable means for locking the driven member and said sleeve in relative adjusted positions including a locking key extending diametrically across the driven member and having a thumb button extending through the axial center of the plate, the upper face of the plate being roughened around said button, the driven member being provided with a single groove for partially receiving the key at all times and the plate being provided with a pair of crossed grooves for selectively receiving said key.

5. In a device of the class described, a band member having an internal cylindrical clutch surface, a slotted cylindrical cage, clutch rollers in said slots, said cage having flanges overhanging the end of the band axially, a stud member supported radially and axially within the cage and cooperating with the clutch rollers to be driven by the band, means carried by the stud member for urging the rollers circumferentially relative to the stud in either one direction or the other, and a lock member mounted on the stud member and having a release member projecting through the end of the cage, said cage having a pair of selectable stops for alternative engagement by the lock member to retain the stud member and the cage in adjustment to each other in either of two clutching positions.

6. In a device of the class described, a band member having an internal cylindrical clutch surface, a slotted cylindrical cage, clutch rollers in said slots, said cage having flanges overhanging the end of the band axially, a stud member supported radially and axially within the cage and cooperating with the clutch rollers to be driven by the band, means carried by the stud member for urging the rollers circumferentially relative to the stud in either one direction or the other, and a shiftable lock member between the stud and the cage for positively locking the stud and cage together in either of two positions for producing a clutching action alternatively in one direction of rotation or the other, and a release button extending from the shiftable lock member axially outside the cage, said button being movable axially of the cage for releasing the locking engagement of said lock member.

7. In a device of the class described, a first clutch member having an internal cylindrical clutch surface, a slotted cylindrical cage having end plates for holding the cage against axial movement within said cylindrical clutch surface, clutch rollers in the slots in said cage, a second clutch member comprising a stud extending through one of the end plates of the cage and having a shoulder resting endwise against said one end plate, the stud terminating at the other end plate and being held against axial displacement between said end plates, said stud member cooperating with the clutch rollers to be driven by the first clutch member rotarily in either direction, means carried by the stud member for urging the rollers circumferentially relative to the stud in either one direction or the other, a shiftable lock member between the stud and the cage for positively locking the stud and cage together in either of two positions for producing a clutching action alternatively in one direction of rotation or the other, and a release member comprising a cylindrical shank guided in the adjacent end plate and being seated in the adjacent end of the stud, said release member being movable axially of the cage for releasing the locking engagement of said lock member.

8. In a device of the class described, a band having an internal cylindrical clutch surface, a cylindrical slotted cage disposed within the band, said cage having flanges overhanging the ends of the band to hold the cage against axial displacement, clutch rollers in the slots of the cage, a central clutch member of polygonal section cooperating through said rollers with the cylindrical clutch surface of the band, means carried by the central member for urging the rollers selectively in either direction of rotation to produce clutching optionally in either direction, said member being guided radially in the cage at each end of the cage, and said member having shoulders bearing axially against the internal surfaces of the cage at each end of the cage, said member having an operating extension projecting through one end of the cage, the cage closing off the space between the member and the band.

EDWARD M. PFAUSER.